US008204340B2

(12) United States Patent
Kanazawa et al.

(10) Patent No.: US 8,204,340 B2
(45) Date of Patent: Jun. 19, 2012

(54) METHODS AND APPARATUS FOR DOT MARKER MATCHING

(75) Inventors: Nori Kanazawa, San Rafael, CA (US); Douglas Epps, San Rafael, CA (US)

(73) Assignee: Two Pic MC LLC, Burbank, CA (US)

( * ) Notice: Subject to any disclaimer, the term of this patent is extended or adjusted under 35 U.S.C. 154(b) by 927 days.

(21) Appl. No.: 12/240,655

(22) Filed: Sep. 29, 2008

(65) Prior Publication Data

US 2010/0080447 A1    Apr. 1, 2010

(51) Int. Cl.
*G06K 9/36*    (2006.01)
*G06K 9/32*    (2006.01)
(52) U.S. Cl. ........ 382/285; 382/276; 382/286; 382/287; 382/294
(58) Field of Classification Search .................. None
See application file for complete search history.

(56) References Cited

U.S. PATENT DOCUMENTS

| | | | | |
|---|---|---|---|---|
| 5,432,712 | A | * | 7/1995 | Chan ............................. 382/191 |
| 5,852,683 | A | * | 12/1998 | Jewel ............................ 382/284 |
| 6,028,955 | A | | 2/2000 | Cohen et al. |
| 6,496,594 | B1 | * | 12/2002 | Prokoski ....................... 382/118 |
| 6,917,702 | B2 | | 7/2005 | Beardsley |
| 2004/0249809 | A1 | | 12/2004 | Ramani et al. |
| 2007/0091178 | A1 | | 4/2007 | Cotter et al. |
| 2007/0139433 | A1 | * | 6/2007 | Anderson et al. ............. 345/582 |
| 2007/0217665 | A1 | * | 9/2007 | Kiraly et al. .................. 382/128 |
| 2008/0180436 | A1 | * | 7/2008 | Kraver .......................... 345/420 |

OTHER PUBLICATIONS

International Search Report dated Nov. 25, 2009 for International Application No. PCT/US2009/058842, filed Sep. 29, 2009.

* cited by examiner

*Primary Examiner* — Jason M Repko
*Assistant Examiner* — David F Dunphy
(74) *Attorney, Agent, or Firm* — Kilpatrick Townsend and Stockton LLP

(57) ABSTRACT

A method for a computer system includes receiving a first camera image of a 3D object having sensor markers, captured from a first location, at a first instance, receiving a second camera image of the 3D object from a second location, at a different instance, determining points from the first camera image representing sensor markers of the 3D object, determining points from the second camera image representing sensor markers of the 3D object, determining approximate correspondence between points from the first camera image and points from the second camera image, determining approximate 3D locations some sensor markers of the 3D object, and rendering an image including the 3D object in response to the approximate 3D locations.

16 Claims, 10 Drawing Sheets

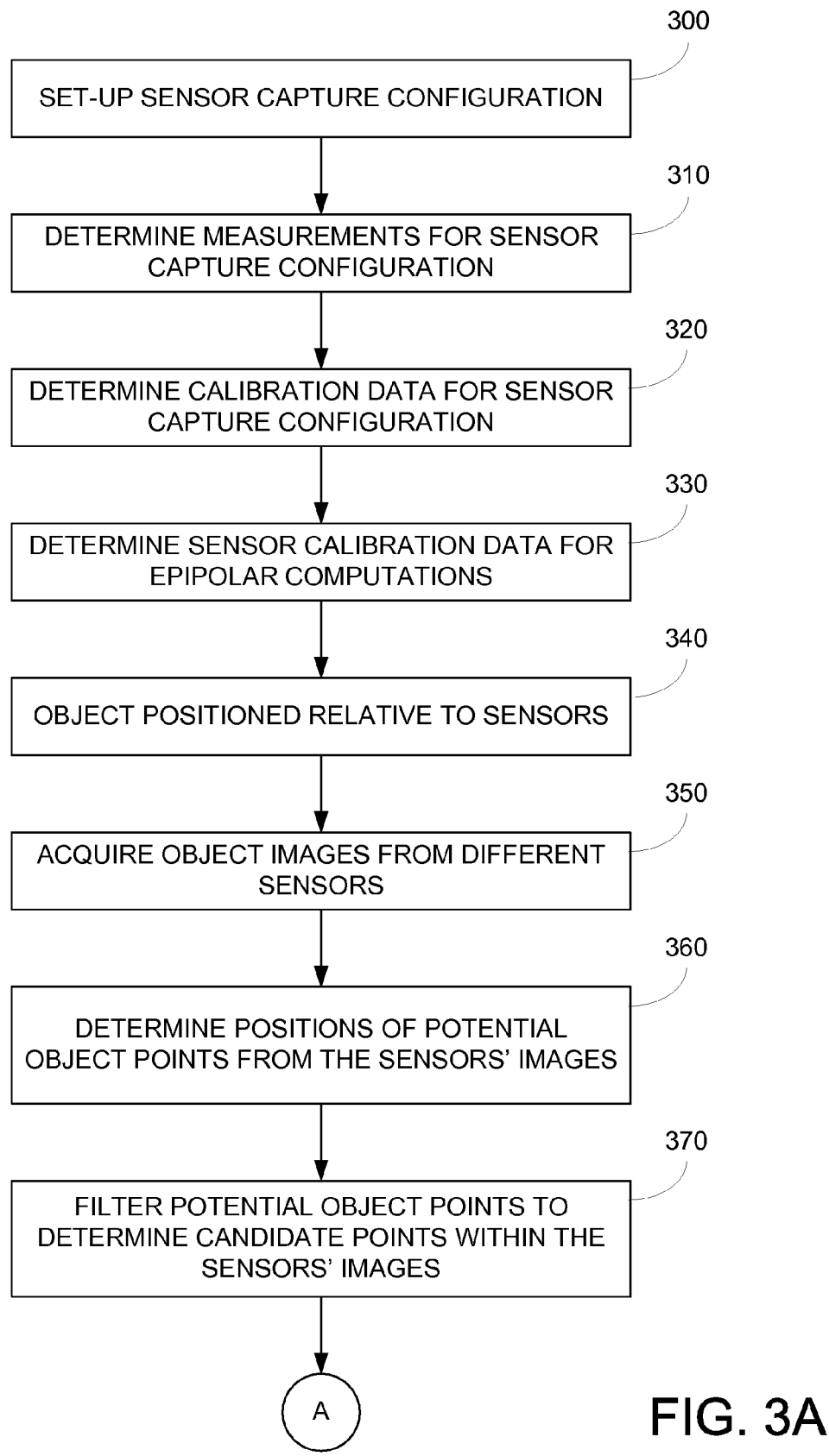

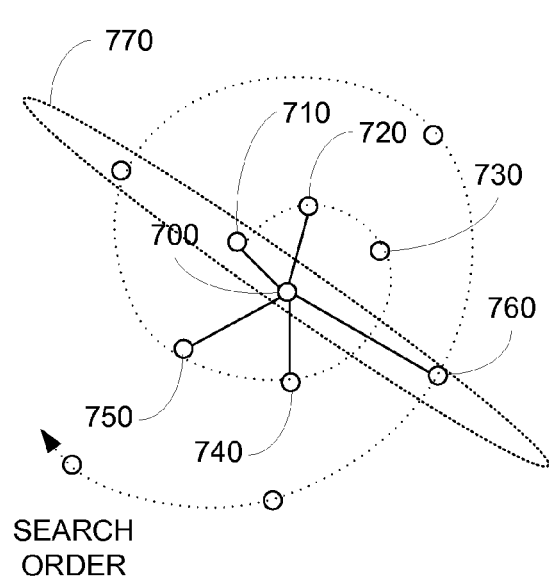 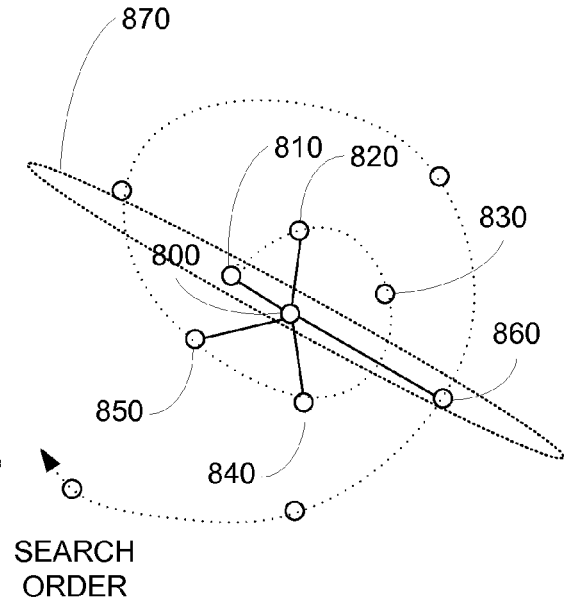
FIG. 5A                FIG. 5B
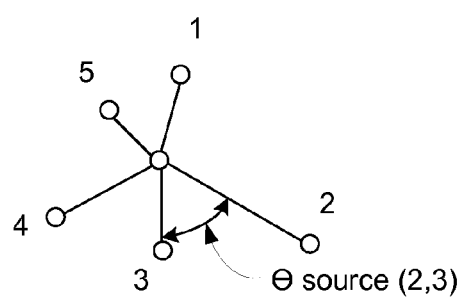 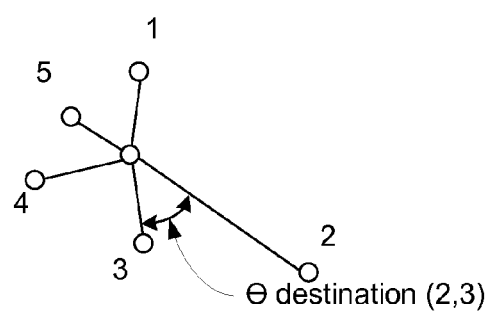
FIG. 6A
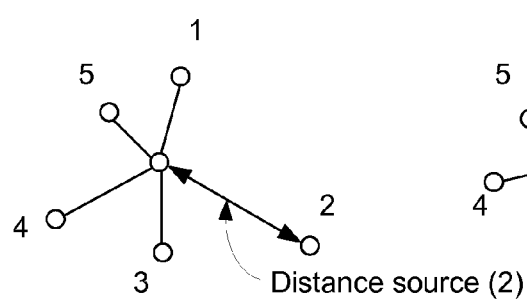 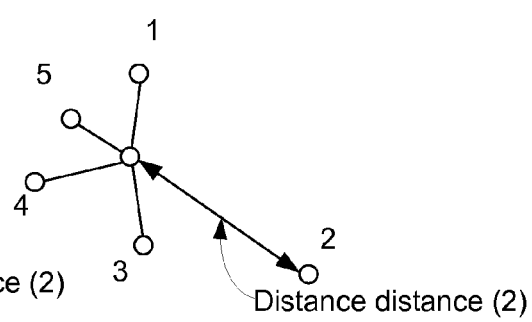
FIG. 6B

METHODS AND APPARATUS FOR DOT MARKER MATCHING

CROSS-REFERENCES TO RELATED APPLICATIONS

The present invention is related to U.S. application Ser. No. 12/240,907, filed Sep. 29, 2008, titled: Actor-Mounted Motion Capture Camera. This application is incorporated by reference, for all purposes.

BACKGROUND OF THE INVENTION

The present invention relates to computer capture of object motion. More specifically, embodiments of the present invention relate to capturing of facial movement or performance of a actor.

Traditional computer animation of objects is determined by users known as animators. These animators are skilled artists who would specify movement of objects, such as people, within a computer environment. As a model for human movement, many animators often referred to how they moved, through the use of mirrors, video cameras, or the like.

animation has also been based more directly upon physical movement of actors. This animation is known in the film industry as motion-capture or performance capture. In such cases, an actor is equipped with a suit with a number of markers, and as the actor moves, a number cameras track the positions of the markers in space.

One of the pioneering companies in the field of motion-capture or performance-capture for animated feature films has been ImageMovers. ImageMovers, now ImageMovers Digital (IMD), has been the producer of animated features such as "Polar Express" (2004), "Monster House" (2006), and "Beowulf" (2007), and has been nominated for multiple Academy Awards®.

With current motion-capture systems, such as those provided by Vicon, the number of markers on the body of an actor may approach 200, and the number of markers on a face of an actor may approach 200. Additionally, a hundred cameras are provided that surround the set, so that as the actor moves on the set, the positions of the markers can roughly be determined.

The inventor has recognized that a drawback with current systems is that facial performance of an actor is often difficult to capture. The inventor attributes this to the small movement of facial markers of an actor compared to the larger movement of body markers of the actor. Because the distance between the actor and the cameras around the set is large compared to the movement of an eyebrow of an actor, for example, it is often difficult to resolve such movement, even when using a high resolution camera.

One system that attempts to address this issue has included the use of a rig that an actor wears that includes a camera to capture the right side of an actor's face, and another camera to capture the right side of an actor's face. Drawbacks to such systems include that the cameras use are heavy, and that the rigging worn by the actor are often heavy. Accordingly, actors often do not like to wear such rigs, or flatly refuse to wear such rigs.

One solution to this has been developed by ImageMovers Digital, the assignee of the present invention, and is described in the co-pending application described above. This solution provides a light-weight rig camera configuration that can capture multiple views of an actor's face without inhibiting their performance.

Another drawback to current systems includes that captured facial performance data are used for producing statistical models of facial animation. That statistical model then drives the animation. Because the model is statistical, nuances in actor facial movements, such as an actor's well-known facial quirks, grins, poses, or the like, are often not reflected in such statistical models. Because of this, the produced animation often lacks the "life" or "realism" needed to fully convey the actor's performance. Accordingly, computer animated characters based upon statistical techniques often fall within the "uncanny valley."

In light of the above, what is initially desired are improved methods and apparatus addressing the problems described above.

BRIEF SUMMARY OF THE INVENTION

The present invention relates to computer capture of object motion. More specifically, embodiments of the present invention relate to capturing of facial performance movement of actors, such as human actors.

Various embodiments of the present invention capture images of an object from two different perspectives, at substantially the same time. Using image processing techniques, markers on the surface of the object are detected as points upon the two or more captured images. A graph matching technique is then used to provide a good, if not best, possible matches between points in the captured images. Based upon the matched points, the markers on the surface of the object can be triangulated to a 3D position. Rendering of a object may then be driven with the 3D positional data to form one or more images. Embodiments may be used for computer or console gaming, feature-length animated features, or the like.

Still other embodiments of the present invention capture images of an object from roughly a set position and at different time. Using image processing techniques, markers on the surface of the object are again detected as points upon the two or more captured images. Graph matching technique such as a Graph-edit distance, A*, or the like may then used to provide a good, if not best, possible matches between points in the captured images. Based upon the matched points, the markers on the surface of the object can be triangulated to a 3D position. In such cases, this data represents the performance of the actor over time. Rendering of a object may then be driven with the 3D positional data to form one or more images. Embodiments may be used for computer or console gaming, feature-length animated features, or the like.

In various embodiments of the present invention, epipolar data may also be used to facilitate the matching of points between the captured images.

According to various embodiments, a method for a computer system is disclosed. One method may include receiving a first view of a three-dimensional object from a first sensor from a first location with respect to the three-dimensional object, at a first instance in time, wherein the object includes a plurality of sensor markers, and receiving a second view of the three-dimensional object from a second sensor from a second location with respect to the three-dimensional object, at substantially the first instance of time. A technique may include determining a first plurality of points from the first view of the three-dimensional object in response to a first plurality of sensor markers from the plurality of sensor markers, and determining a second plurality of points from the second view of the three-dimensional object in response to a second plurality of sensor markers from the plurality of sensor markers. A process may include determining at least an approximate correspondence between points in a subset of points from the first plurality of points and points in a subset of points from the second plurality of points, determining approximate three-dimensional locations of a third plurality of sensor markers from the plurality of sensor markers in response to the approximate correspondence, and rendering an image of the three-dimensional object in response to the approximate three-dimensional locations of the third plurality of sensor markers.

According to various embodiments, a computer system is disclosed. One device includes a memory configured to store a first view of a three-dimensional object from a first sensor from a first location with respect to the three-dimensional object, at a first instance in time, wherein the object includes a plurality of sensor markers, and configured to store a second view of the three-dimensional object from a second sensor from a second location with respect to the three-dimensional object, at substantially the first instance of time. An apparatus includes a processor coupled to the memory, wherein the processor is configured to determine a first plurality of points from the first view of the three-dimensional object in response to a first plurality of sensor markers from the plurality of sensor markers, wherein the processor is configured to determine a second plurality of points from the first view of the three-dimensional object in response to a second plurality of sensor markers from the plurality of sensor markers, wherein the processor is configured to determine at least an approximate correspondence between points in a subset of points from the first plurality of points and points in a subset of points from the second plurality of points, and wherein the processor is configured to determine approximate three-dimensional locations of a third plurality of sensor markers from the plurality of sensor markers in response to the approximate correspondence. A system may include a display coupled to the memory and to the processor, wherein the display is configured to display a representation of the approximate three-dimensional locations of the third plurality of sensor markers.

According to various embodiments, a computer program product comprising a computer-readable tangible media including computer-executable code for a computer system including a processor and a memory is disclosed. A tangible media may include code configured to direct the processor to receive a first image of a three-dimensional object from a camera from a first location with respect to the three-dimensional object, at a first instance in time, wherein the object includes a plurality of sensor markers, code configured to direct the processor to receive a second image of the three-dimensional object from the camera from the first location with respect to the three-dimensional object, at a second instance of time. computer executable code may include code configured to direct the processor to determine a first plurality of points from the first image of the three-dimensional object in response to a first plurality of sensor markers from the plurality of sensor markers, and code configured to direct the processor to determine a second plurality of points from the second image of the three-dimensional object in response to a second plurality of sensor markers from the plurality of sensor markers. The tangible media may also include code configured to direct the processor to determine at least an approximate correspondence between points in a subset of points from the first plurality of points and points in a subset of points from the second plurality of points, code configured to direct the processor to determine approximate three-dimensional displacements of a third plurality of sensor markers from the plurality of sensor markers in response to the approximate correspondence; and code configured to direct the processor to display a representation of the approximate three-dimensional displacements of the third plurality of sensor markers on top of the first image. Tangible-media may include optical memories, magnetic memories, semiconductor memories, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 3A-B illustrate a block diagram of a flow chart according to various embodiments of the present invention;

FIGS. 5A and 5B illustrate an example of an embodiment of the present invention;

FIGS. 6A and 6B illustrate an example of an embodiment of the present invention;

DETAILED DESCRIPTION OF THE INVENTION

Figure 1A:
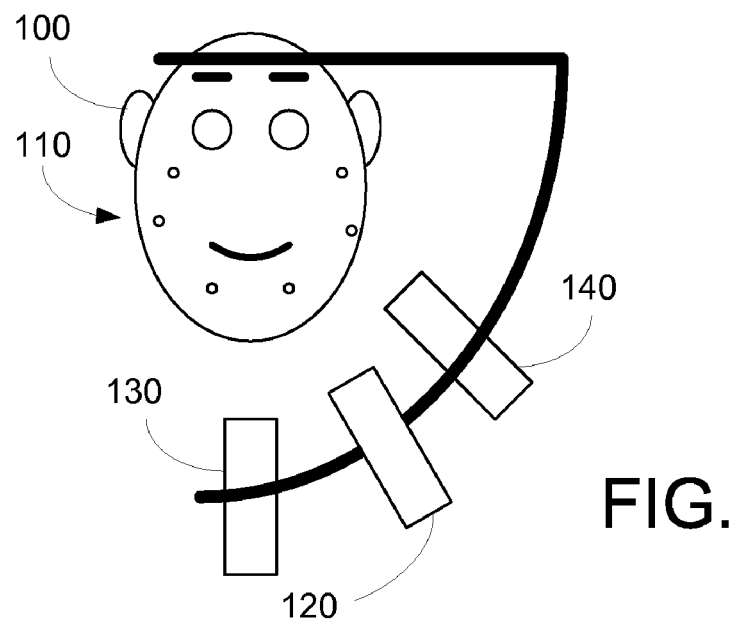
FIGS. 1A and 1B illustrate an example of an embodiment of the present invention.
Figure 1B:
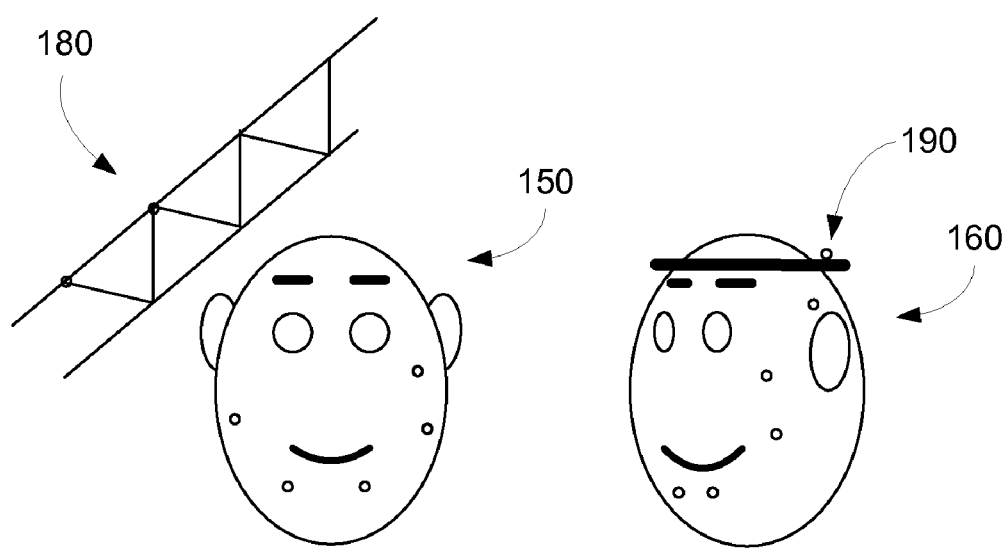

FIGS. 1A and 1B illustrate an example of an embodiment of the present invention. More specifically, FIGS. 1A and 1B illustrate methods for capturing overlapping images from multiple cameras, that are processed according to embodiments of the present invention.

FIG. 1A illustrates a portion of an object 100, such as the head of an actor, including a number of markers 110. In various embodiments, object 100 may be a human actor, an animal, or other object that can be moved. In various embodiments of the present invention, markers 110 may be painted or may be affixed to object 100. For example, markers 110 may be: an ink mark, a reflective sticky dot, a foam ball, an ultraviolet ink mark, a fluorescent ink mark, or the like. FIG. 1A also includes illumination sources 120. In various embodiments, illumination sources 120 are used to illuminate markers 110. For example, if markers 110 are based upon being fluorescent under ultraviolet ink, illumination sources 120 may include ultraviolet lights.

In various embodiments, additional illumination sources may also be provided, to illuminate other portions of object 100, the set, or the like. In still other embodiments, illumination sources 120 may be part of the illumination sources that light-up the set.

Also illustrated in FIG. 1A are a first sensor 130 and a second sensor 140. In various embodiments, sensors 130 and 140 are sensitive to visible light, and in other embodiments, sensors 130 and 140 may be sensitive to other wavelengths of light. The sensitivity may be determined depending upon the types of markers 110 and type of illumination sources 120 used. As examples, if markers 110 are visible black ink marks or reflective markers, illumination sources 120 may include conventional light sources (e.g. mercury or sodium vapor lighting, incandescent lighting, fluorescent lighting, LED lighting, or the like), and sensors 130 and 140 may include conventional video cameras; and in another example, if markers 110 are infrared absorbing material, sensors 130 and 140 may be configured to be sensitive to infrared light, near-infrared light, deep red light, or the like.

In some embodiments of the present invention, sensors 130 and 140 are HD resolution video cameras, although in other embodiments, the resolution may be lower or higher, depending upon specific requirements. As disclosed in the above-mentioned application, sensors 130 and 140 are typically miniaturized HD resolution video cameras that are affixed to a rig that an actor wears. In various embodiments, sensors 130 and 140 capture images of object 100 at the same time, or at substantially the same time, e.g. within a frame time or two.

FIG. 1B illustrates an example of images captured with sensors 130 and 140. In this example, a left image 150 and a right image 160 are respectively captured with sensors 130 and 140. As can be seen, different portions of object 100 are captured from different viewpoints in left image 150 and right image 160.

Also illustrated in FIG. 1B are a number of colored markers 170 (e.g. black-colored, white-colored, etc). In various embodiments of the present invention, not all of markers 110 may be visible to either sensors 130 or 140 at the same time, due to geometry of object 100. As an example, a marker on the right ear of object 100 is not visible to either sensor 130 or sensor 140. Additionally, in various embodiments, not all of markers 110 within the field of view of sensors 130 and 140 may be shown within left image 150 or right image 160. As an example of this, a light reflection from the surface of object 100 may obscure a highlighted-marker from being detected. As another example, markers on the right cheek of object 100 cannot be seen on right image 160. Still further, in various embodiments, as can be seen markers 180 and 190 seen in left image 150 may not be attributed to markers 110. For example, markers 180 may be attributed to portions of the set (e.g. trusses, railings, walls), markers 190 to camera rigging (e.g. head brace, camera boom, etc.), or the like.

Figure 2A:
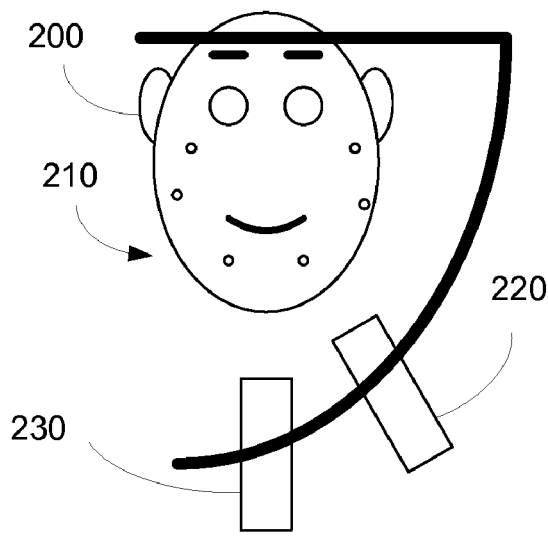
FIGS. 2A and 2B illustrate another example of an embodiments of the present invention.
Figure 2B:
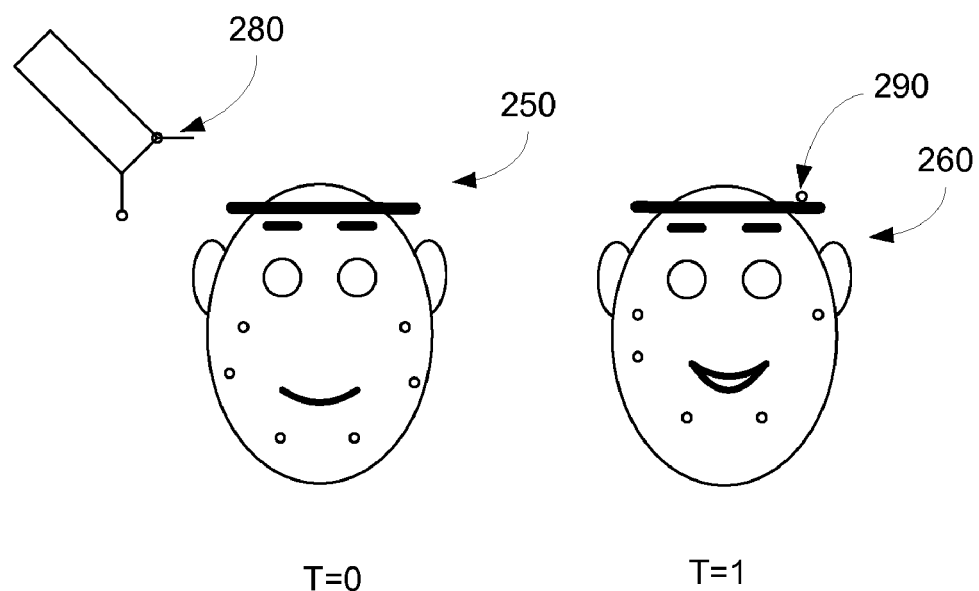

FIGS. 2A and 2B illustrate another example of an embodiments of the present invention. More specifically, FIGS. 2A and 2B illustrate methods for capturing images from a camera at different times, that are processed according to embodiments of the present invention.

FIG. 2A illustrates a portion of an object 200, such as the head of an actor, including a number of markers 210. As described in FIG. 1A, in various embodiments, object 200 may be a human actor, an animal, or other object that can be moved. Additionally, markers 210 and illumination sources 220 may be based upon the same or different technologies as the example in FIG. 1A. In various embodiments, additional illumination sources may also be provided, to illuminate other portions of object 200; the set; or the like.

Also illustrated in FIG. 2A is a sensor 230 which may be sensitive to visible light, other wavelengths of light, or other types of illumination. The sensitivity of sensor 230 may also depend upon the type of markers 210 and type of illumination source 220 used, and can be freely configured for the specific application.

Similar to the embodiment in FIG. 1A, sensor 230 may be an HD resolution video camera, or any other resolution camera. In various embodiments of the present invention sensor 230 is configured to capture images of object 200 at different times, from the same position or at substantially similar positions, e.g. within a few millimeters.

FIG. 2B illustrates an example of images captured with sensor 230. In this example, a first image 250 and a second image 260 are captured with sensor 230 at different times. As can be seen, the surface of object 200 may be positioned differently at different times.

In various embodiments, as discussed in FIG. 1B, above, not all markers 210 may be visible to sensor 230 at a time due to geometry of object 200. Further, not all markers 210 may be visible to sensor 230 because of distortions of the surface of object 200. For example, a marker affixed to the eye lid of an actor may only be seen when the actor blinks. Still further, not all markers 210 may be visible to sensor 230 because of reflections, shadows, or imperfections from the surface of object 200. As examples, a dimple of an actor may appear similar to a marker, or a wrinkle may hide a marker. Still further, in various embodiments, markers 280 and 290, may not be attributed to markers 210. For example, markers 280 may be attributed to portions of the set (e.g. trusses, railings, walls), markers 290 to camera rigging (e.g. head brace, camera boom, etc.), or the like.

In various embodiments of the present invention, the capture of first image 250 and second image 260 in FIG. 2B at different times may be performed by the configuration illustrated in FIG. 1A. More specifically, images from sensor 130, for example may be captured at different times, to generate first image 250 and second image 260.

Figure 3B:
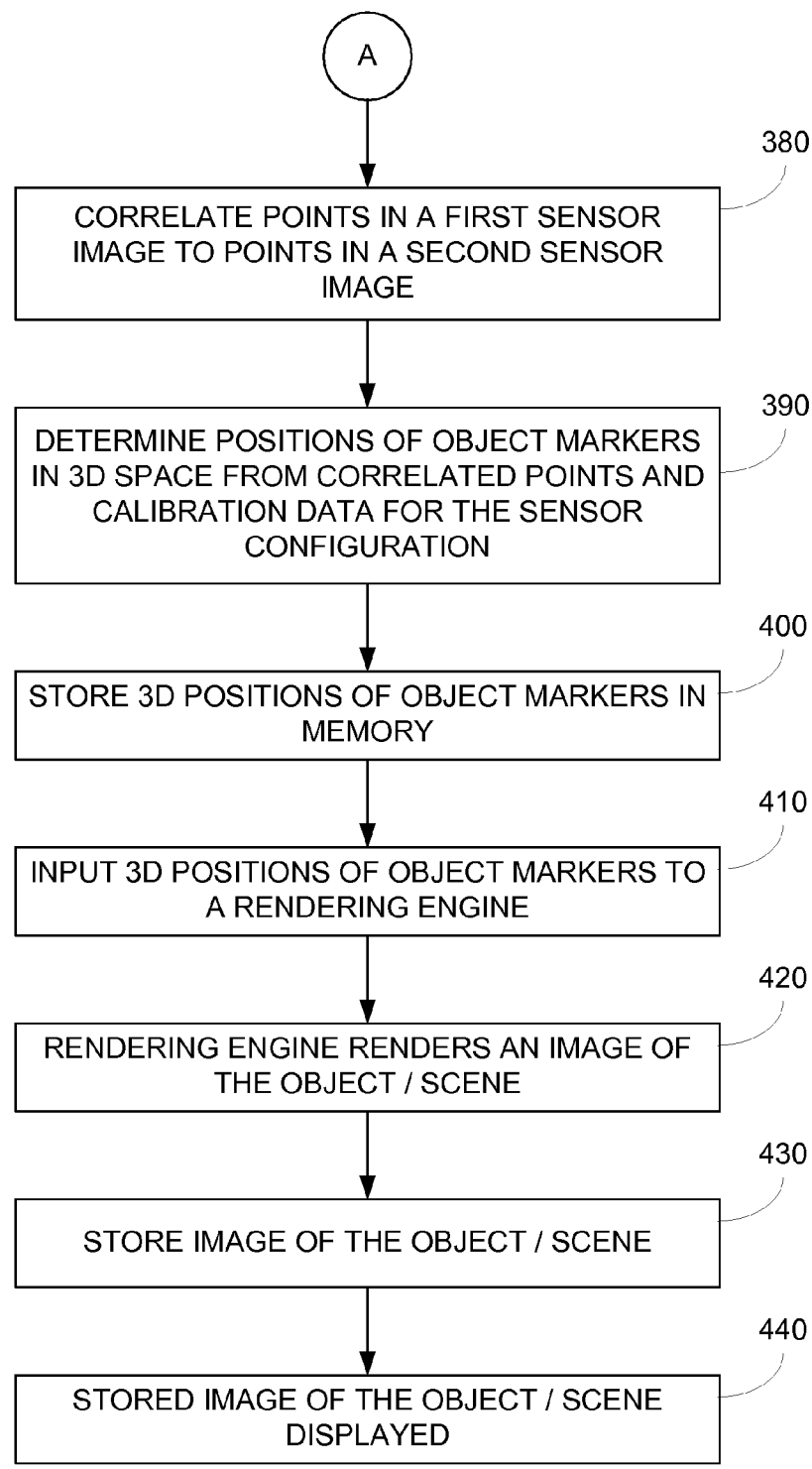

FIGS. 3A-B illustrate a block diagram of a flow chart according to various embodiments of the present invention.

Initially, a first sensor and a second sensor, e.g. HD video cameras, are positioned with respect to a target location, step 300. For instance, a rig, as described in the above-cited patent application for the actor is assembled. In other embodiments, the sensors need not be located upon a common rig, but may be independently mounted, for example, on tripods, or the like.

Next, calibration data may be determined, step 310. In various embodiments of this step, geometric objects (e.g. spheres, squares) with markers are positioned relative to the two sensors/cameras, a right and a left image are captured, and the distances of the markers to the cameras is measured. As an example, a marker on a first cube face is visible on the right side of a right image and the marker is measured to be 9 cm away from a right sensor. The same marker can also be seen on the far right side of a left image and the marker is measured to be 13 cm away from the left sensor. Further, a second marker on a second cube face can be seen on the far left side of a right image and the marker is measured to be 15 cm away from a right sensor. The same marker can also be seen on the left side of the left image and is the marker is measured to be 10 cm away from the left sensor. In various embodiments, the measurements may be performed in conventional ways, e.g. ruler, laser, and the like. Additionally, the measurements may be made with respect to the front of the sensors (lens), the image plane of the sensors, or the like.

In various embodiments, based upon this measurement data, a marker that appears at a first position on an image of the first sensor and at a second position on an image of the second sensor can be mathematically correlated to a position in 3D space, step 320

In some embodiments of the present invention, "epipolar" data is also captured, step 330. In addition to the geometric data captured in step 310, in the present step, the location (first optical center) where the first sensor (first optical sensor) is viewed in the viewing plane of the second sensor is determined. Further, the location (second optical center) where the second sensor (second optical sensor) is viewed in the viewing plane of the first sensor is determined. As will be described below, given the two optical centers (joined by a baseline), and a position of a given marker on the object, an epipolar plane may be determined. Based upon where the epipolar plane intersects the viewing plane of the first sensor, a first epipolar line is determined. Further, based upon where the epipolar plane intersects the viewing plane of the second sensor, a second epipolar line is determined.

In various embodiments of the present invention, the above calibration process in steps 310-330 may be performed prior to the below steps, or subsequent to the image capture steps below.

Next, in various embodiments, a target object is then positioned relative to the first sensor and the second sensor, step 340, and images of the object are captured, step 350. As described above, the object may be actor, or the like, wearing the camera rig above. Alternatively, the actor may place her head into a fixed location (similar to an eye testing machine), or the like. In still other embodiments, many other ways for performing this task should be understood.

after being positioned, as the actor performs (e.g. reads lines with emotion), images of the actor's face are taken by the two sensors, at substantially the same time. As mentioned above, the capturing may be performed by HD video cameras from the respective sensor locations that are synchronized, or are captured within one or two frame-times. In various embodiments, video data may be continually streamed from the HD cameras, and frames of the HD video are time stamped and stored in a video recorder, e.g. a computer. Later, the images from the two cameras with the same or substantially similar time stamp are retrieved from storage, and processed as described below.

In various embodiments, for each frame of video from each sensor, the positions of markers are determined, step 360. Conventional image processing techniques may be used to locate the point positions of the markers in the images. In various embodiments, the markers may be black dots against the image, white markers against the image, glowing markers, or the like.

Next, in some embodiments of the present invention, some of the points in the image may be eliminated as candidate markers, step 370. As illustrated in FIGS. 1B, and 2B, a number of markers that are located in each image may be "false" markers. More specifically, markers not associated with the actor's face (e.g. set truss, light reflection, and the like) may be eliminated. In practice, is not uncommon to locate 140 markers in an image in step 360, when the number of "true" markers should be only be about forty. In various embodiments, this process may be performed automatically or manually, by referring to a silhouette of the actor's head in the images, for example.

In various embodiments of the present invention, given the reduced number of markers in the two images, a graph matching algorithm is used to correlate markers in each image, step 380. More particularly, using an A* algorithm, or the like, described below, a marker that appears at a first location in the image from the first sensor is associated with a marker that appears at a second location in the image from the second sensor. In various embodiments, it is not expected that all markers that appear in first sensor image will also appear in the second sensor image, because of geometric characteristics of the object, because of reflections, distortion of markers on the object's surface, other artifacts, and the like. In various embodiments, this step matches up some points that are likely to be caused by the same marker on the object. In other embodiments, this step matches up as many points that are likely to be caused by the same marker, as possible, for example by using a least cost analysis.

Next, in various embodiments, given the position of a point in the first sensor image, the position of a point in the second sensor image, and the calibration data described above, a 3D position may be determined for the marker, step 390. More specifically, via triangulation techniques, the position of the marker on the surface of the object can be determined. In various embodiments, the 3D positions for other markers on the object may also be determined. This process may be performed at different times, to thereby determine where and how a marker on the face of an actor moves as he performs. For example, when smiling, a marker located at a dimple of an actor may move farther away from the sensors, and when blowing a raspberry, the same marker may move towards the sensors.

In various embodiments, the determined 3D positions of at least some of the markers on the object may be stored in non-volatile memory for subsequent use, step 400. In various embodiments, the 3D position data may be input to a computer rendering process, step 410. More specifically, the 3D position data may be used to drive or set a pose of a computer generated object, e.g. face.

In various embodiments, an image is then determined based upon the pose of the computer generated object, step 420. In some embodiments, the image may be performed in a render farm, in a graphics processing unit (GPU), or the like. Further the rendering step may be performed in real-time or near-real-time (e.g. for gaming), non-real time (e.g. for an animated feature film), or the like.

In various embodiments, the rendered images may be immediately displayed (e.g. for gaming), and in other embodiments, the image may be stored onto a tangible media (e.g. hard disk, optical disk, film media, or the like), step 430. One or more copies of the tangible media may then be made and distributed. Subsequently the stored image may be retrieved and displayed to a user (e.g. an animator, an audience member, or the like), step 440.

The above flow process may be adapted for the embodiments illustrated in FIGS. 2A and 2B. More specifically, steps 300-320 may similarly be performed with two sensors to correlate a marker positions viewed from one sensor image to distance away from the marker. Additionally steps 340 and 350 may be performed to capture a sensor image of the object at two different times. Based upon the two images, a set of "likely" points can be determined from both images, similar to the process described in steps 360-370.

Next, in various embodiments, using the likely set of points in the images, a graph matching algorithm can again be used to attempt to correlate the points between the two images as described in step 380 to the same marker. Based upon the correlated points, the displacement of the surface of the marker can be determined with respect to time in step 390. For example, when an actor smiles, a marker located in the corner of the actor's mouth can be seen to move upwards on the actor's face. Subsequently, steps 400-440 may then be repeated in various embodiments.

Figure 4A:
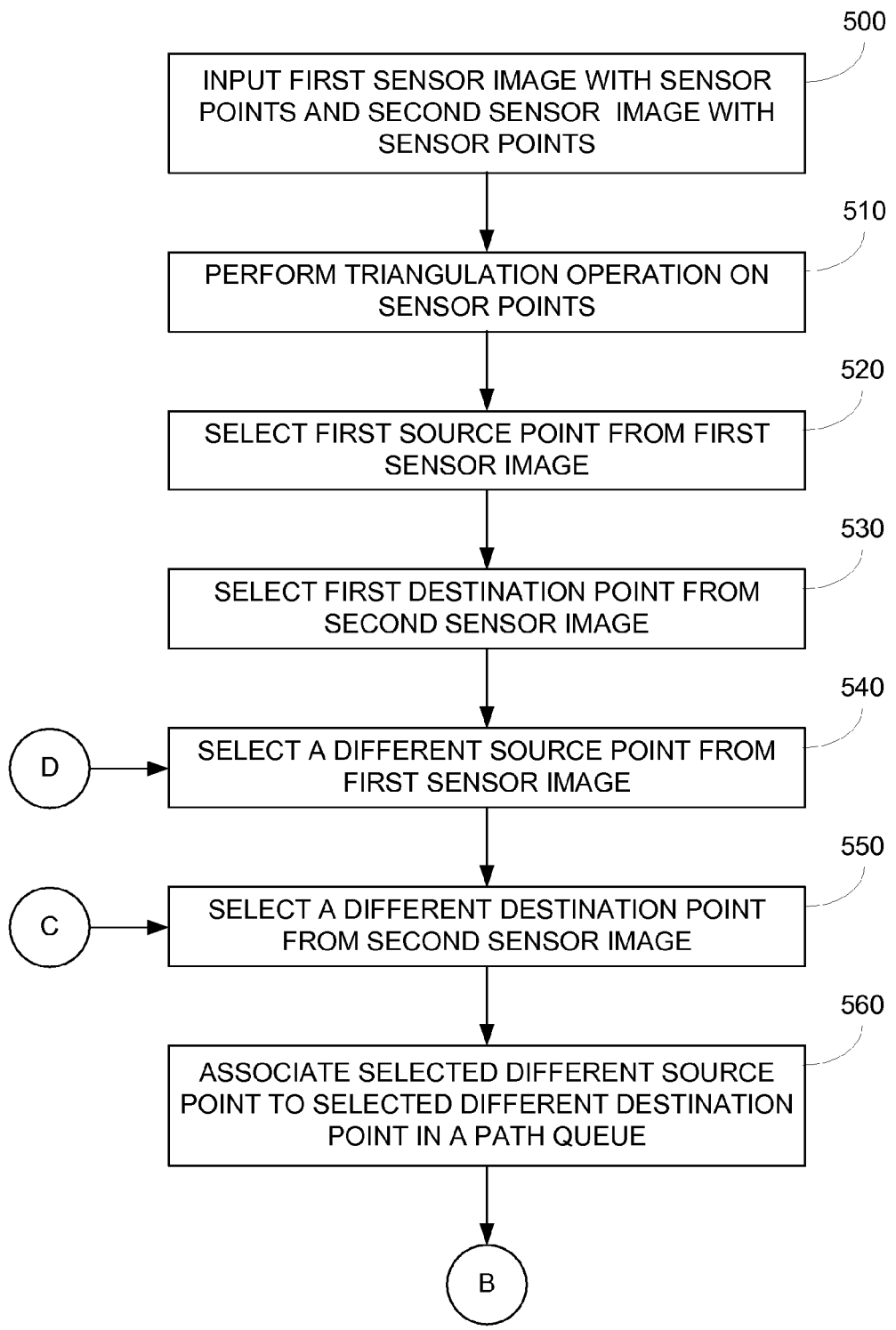
FIGS. 4A-B illustrate a block diagram of a flow chart according to various embodiments of the present invention.
Figure 4B:
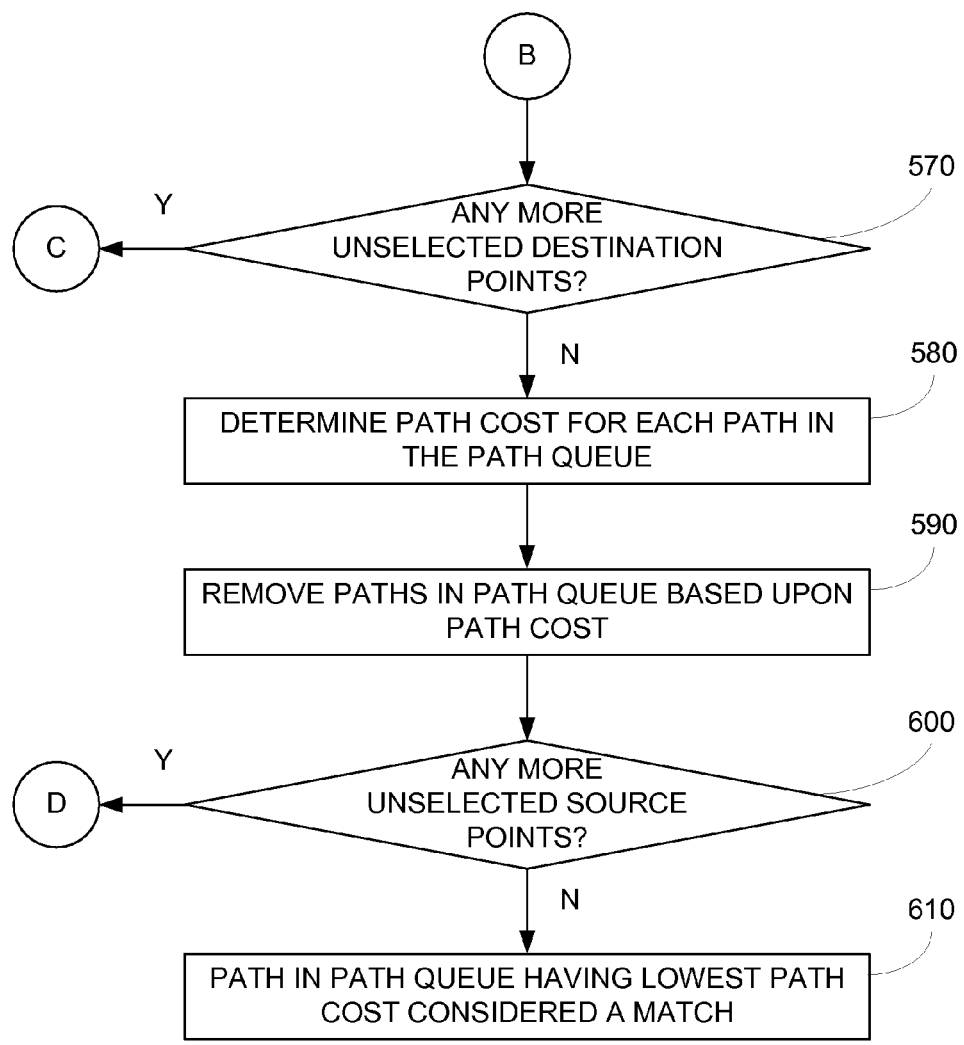

FIGS. 4A-B illustrate a block diagram of a flow chart according to various embodiments of the present invention. More specifically, FIGS. 4A-B illustrate an embodiment of a graph matching algorithm referred to in step 380.

Initially two images including markers are provided, step 500. As described above, the two images may represent images of an object taken at roughly the same time, but from different vantage points, images of the object taken at different times, but from the same vantage point, or the like. Additionally, as described above, the two images will include a number of located points. In various embodiments, the points may be identified by coordinate pair (e.g. (x,y)) on the respective images.

In some embodiments of the present invention, a number of geometric shapes are determined connecting points from each image, step 510. As an example, the geometric objects may be triangles having vertices located at the (x,y) coordinate pairs, quadrilaterals having vertices located at the (x,y) coordinate pairs, or the like. Various algorithms may be used to determine a connectivity of these points, in each image, such as a Delauney triangulation, or the like. In some embodiments, this step need not be performed.

Next, a first point is selected from a first (source) image, step 520. In various embodiments, this first point may be selected in any way. For example, the point may be a point located closest to a corner such as a lower right hand corner of an image, a upper left hand corner of the image, or the like. In various examples, the first source point 700 is connected to four other points, see FIG. 5A.

In various embodiments, a first (destination) point is also selected from the second (destination) image, step 530. In various embodiments, this first point may also be selected in any way. For example, the point may also be a point located closest to a corner such as a lower right hand corner of an image, a upper left hand corner of the image, or the like. An example of a destination image is illustrated in FIG. 5B. In various embodiments, the first destination point 800 becomes associated to first source point 700, and the remaining destination points are considered initially not associated with any source points.

In various embodiments of the present invention, two cost functions may be computed under this A* approach. One cost function includes computing a cost depending upon differences in angles between markers in the source image and in the destination image. More specifically, in various embodiments, the cost function computes the sum of angle distances, as illustrated in FIG. 6A:

$$\Sigma_i |\Theta_{source}(i, i+1) - \Theta_{destination}(i, i+1)|$$

Another cost function includes computing a cost depending upon differences in distances between markers in the source image and in the destination image. More specifically, in various embodiments, the cost function computes the sum of distance distances (e.g. away from the center marker to marker 1), as illustrated in FIG. 6B:

$$\Sigma_i |distance_{source}(i) - distance_{destination}(i)|$$

Initially, in various embodiments of the present invention, based upon distance away from first source point 700, a source point is determined, step 540. In the example in FIG. 5A, a number of source points are illustrated including: first source point 700, second source point 710, third source point 720, fourth source point 730, fifth source point 740, sixth source point 750, seventh source point 760, and the like. In this example, second source point 710 is initially selected.

Next, a destination points is selected, step 550. In various embodiments of the present invention, the initial selection may be based upon distance away from first destination point 800. In the example in FIG. 5B, a number of destination points are illustrated including: first destination point 800, second destination point 810, third destination point 820, fourth destination point 830, fifth destination point 840, sixth destination point 850, seventh destination point 860, and the like. In this example, second destination point 810 is initially selected.

In various embodiments of the present invention, a pairing or association of second source point 710 and second destination point 810 is pushed to a path queue, step 560. The process then iterates, with another destination point being associated with second source point 710, and that pairing or association pushed to the path queue.

In various embodiments, this process continues until the selected source point has been paired or associated with all unassociated destination points, step 570. In such embodiments, the path queue may have entries such as: {(second source point 710:second destination point 810, cost), (second source point 710:third destination point 820, cost), . . . (second source point 710:second destination point 850, cost), (second source point 71 missing, cost), (second source point 710:fourth destination point 840), . . . }. In other embodiments of the present invention, this process may continue until different types of criteria are satisfied. For example, instead of pairing a source point with all unassociated destination points, the paired destination points may be within a specific distance from first destination point 800; the paired destination points may be within a specific quadrant with respect to first destination point 800; or the like.

In various embodiment of the present invention, epipolar lines may also be used to facilitate the present process. As was discussed above, knowing the geometry of the sensor configuration (e.g. baseline, epipoles, right image plane, and left image plane, etc.), and the desired source point, epipolar lines can be determined. In FIG. 5B, an example of a first epipolar line is illustrated as 870 in the destination image.

In various embodiments, the epipolar line (or epipolar region, in this example) is used to reduce the number of destination points to pair-up. Accordingly, instead of pairing second source point 710 with destination points 820, 830, 840, 850, or the like in the path queue, only points along the epipolar line or region may be used. In this partial example, in the path queue, second source point 710 is only paired with seventh destination point 860. As can be seen, the number of pairs in the path queue can be dramatically reduced, the amount of time for calculating costs is reduced, and the matching process is facilitated, as will be described below.

Next, in various embodiments, the cost function, described above, is determined for the pairings in the path queue, step 580. As disclosed above, the cost may be determined based upon difference in distance, difference in angle, combinations of the differences, and the like. In various embodiments, when the differences are higher, the costs of the match are higher.

In the some embodiments of the present invention, pairings of a source point to a specific destination point are removed from the path queue, based upon cost, step 590. In one embodiment, only the path with the lowest cost is maintained in the path queue. In other embodiments, paths with higher cost are removed, and any number greater than one lower cost pairing are maintained in the path queue. Referring to the example in FIGS. 5A-B, based upon cost, the path queue maintains the paths: {(second source point 710:second destination point 810, cost), (second source point 710:third destination point 820, cost), and (second source point 710:second destination point 850, cost), (second source point 710: missing, cost)}. As can be seen, more than one path may be maintained. In various embodiments, destination points that are not maintained in the path queue may be marked unassociated.

The process then repeats for the next unassociated or unpaired source point, step 600. Similar to the process described above for destination points, the next source point may be selected based upon the distance away from the first source point. In other embodiments, other criteria may be used to select the next source point, such as angle, combination of angle and distance, connectivity of the geometric mapping of step 510, above, or the like.

In various embodiment of the present invention, epipolar lines may also be used to facilitate the present process. As was discussed above, knowing the geometry of the sensor configuration (e.g. baseline, epipoles, right image plane, and left image plane, etc.), and the first source point, epipolar lines can be determined. In FIG. 5A, an example of a first epipolar line is illustrated as 770 in the source image.

In various embodiments, the epipolar line (or epipolar region, in this example) is used to reduce the number of source points to pair-up. Accordingly, when determining which source points to use for the next source point, referring to epipolar line 770, sixth source point 760 should be selected. Further more, source points 720, 730, 740, and 750 are not typically selected for iteration and pairing in the path queue because they are not within epipolar line 770 (epipolar region). As can be understood, the number of pairs in the path queue can thus be dramatically reduced, the amount of time for calculating costs is reduced, and the matching process is facilitated.

Continuing the example described in FIGS. 5A-B, the selected source point may be the third source point 720. As was described above, pairings of the third source point 720 and unassociated destination points are then placed in the queue, and when pairings are complete, the cost is determined. Similar to the above, paths with higher cost are removed from the path queue. At the end of the second iteration, the path queue may maintain the paths: {(second source point 710:second destination point 810, third source point 720:third destination point 820, cost), (second source point 710:third destination point 820, third source point 720:fourth destination point 830, cost), etc.}.

In various embodiments of the present invention, the process repeats until most, if not all source markers are associated with a destination marker in the path queue. In various embodiments of the present invention, it is likely that not all source points and/or all destination points will be associated or paired in the path queue, as will be described below.

Subsequently, the path in the path queue associated with the lowest cost is considered a match, step 610. Accordingly, as a result, in various embodiments, a good, if not best possible, match is made between the source points in the source image and the destination points in the destination image.

Figure 7A:
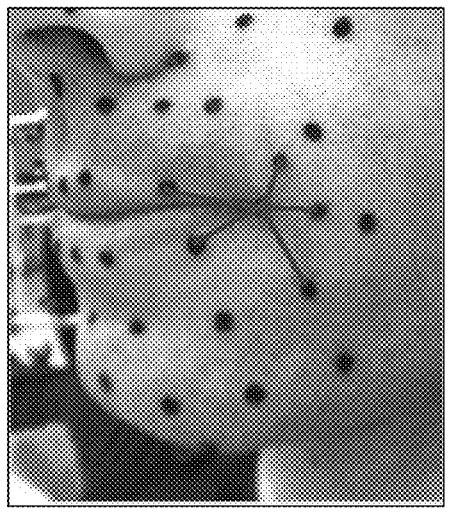
FIGS. 7A and 7B illustrate an example of an embodiment of the present invention.
Figure 7A:
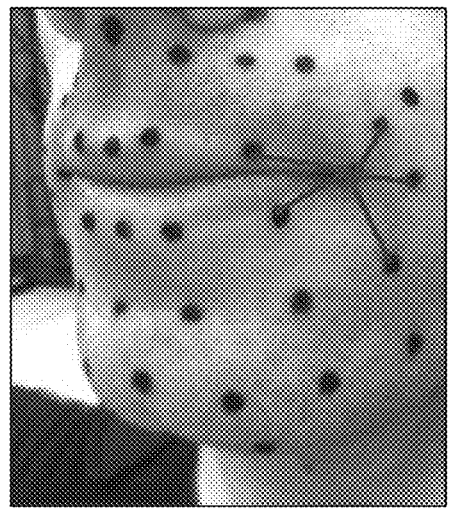

In various embodiments of the present invention, when matching between images captured according to the embodiment illustrated in FIG. 1A, cost functions consider both the angle and distance metrics. As illustrated in the example in FIG. 7A, these metrics have proven to be effective.

Figure 7B:
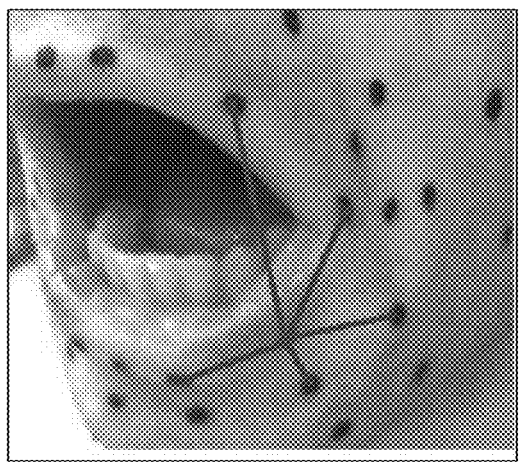
Figure 7B:
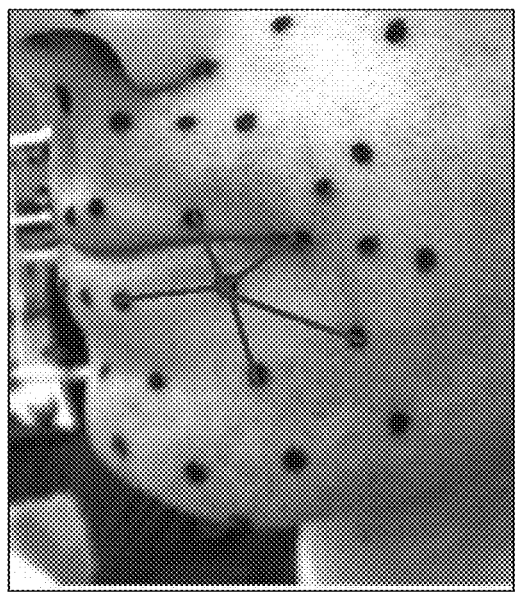

In various embodiments of the present invention, when matching between images captured according to the embodiment illustrated in FIG. 1B, cost functions typically only consider the angle metric. As illustrated in the example in FIG. 7B, the angles may roughly be maintained, however the distances often change dramatically.

In various embodiments of the present invention, markers may not appear in images for a number of reasons, including secular reflection from the surface of the object, insufficient illumination, creases or other geometric features on the surface of the object, and the like. In such cases, this may result in a number of "points" that may be missing in either of the source image or the destination image. For example, a marker may appear as a source point in a source image but not in the destination image.

Figure 8:
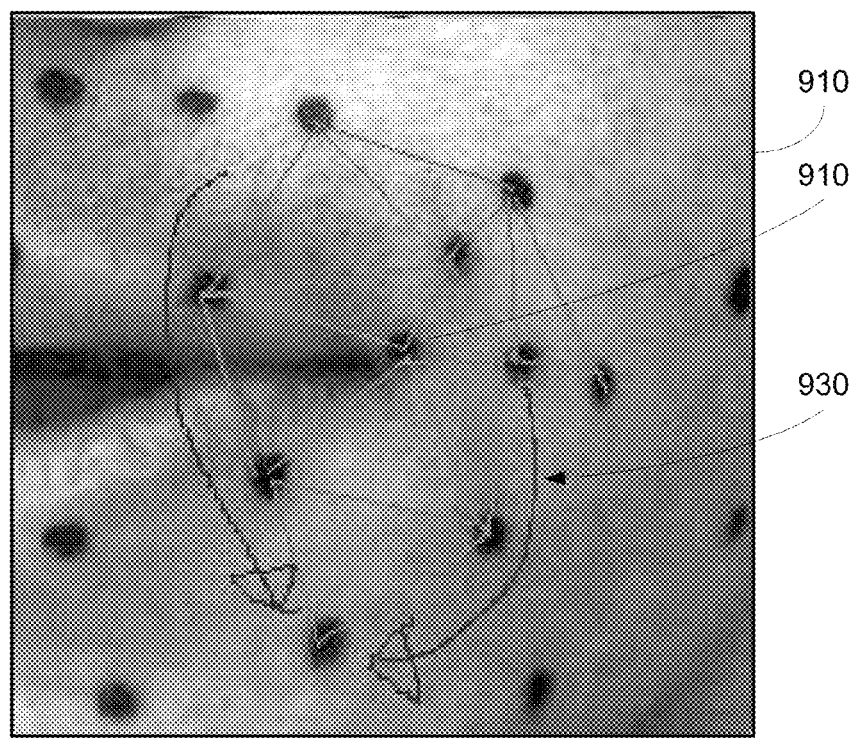
FIG. 8 illustrates an example of an embodiment of the present invention.
Figure 8:
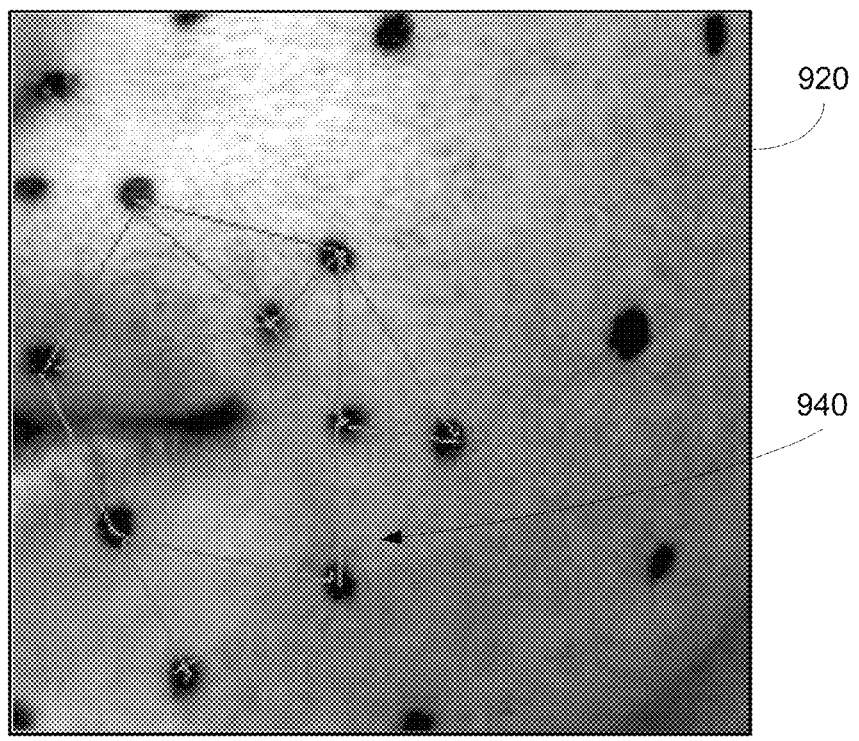

In such cases, not all source points and/or not all destination points will be paired-up or associated with other points in the path queue. As illustrated in FIG. 8, although a marker on an object may appear as source point 900 in source image 910, the marker does not appear as a destination point in destination image 920. Despite this, as can be seen, other source points 930 around source point 900 are matched to other destination points in destination image 920. As can be seen, in the embodiment of the matching process, described above, missing matches do not appreciably increase the cost of this path match.

Figure 9:
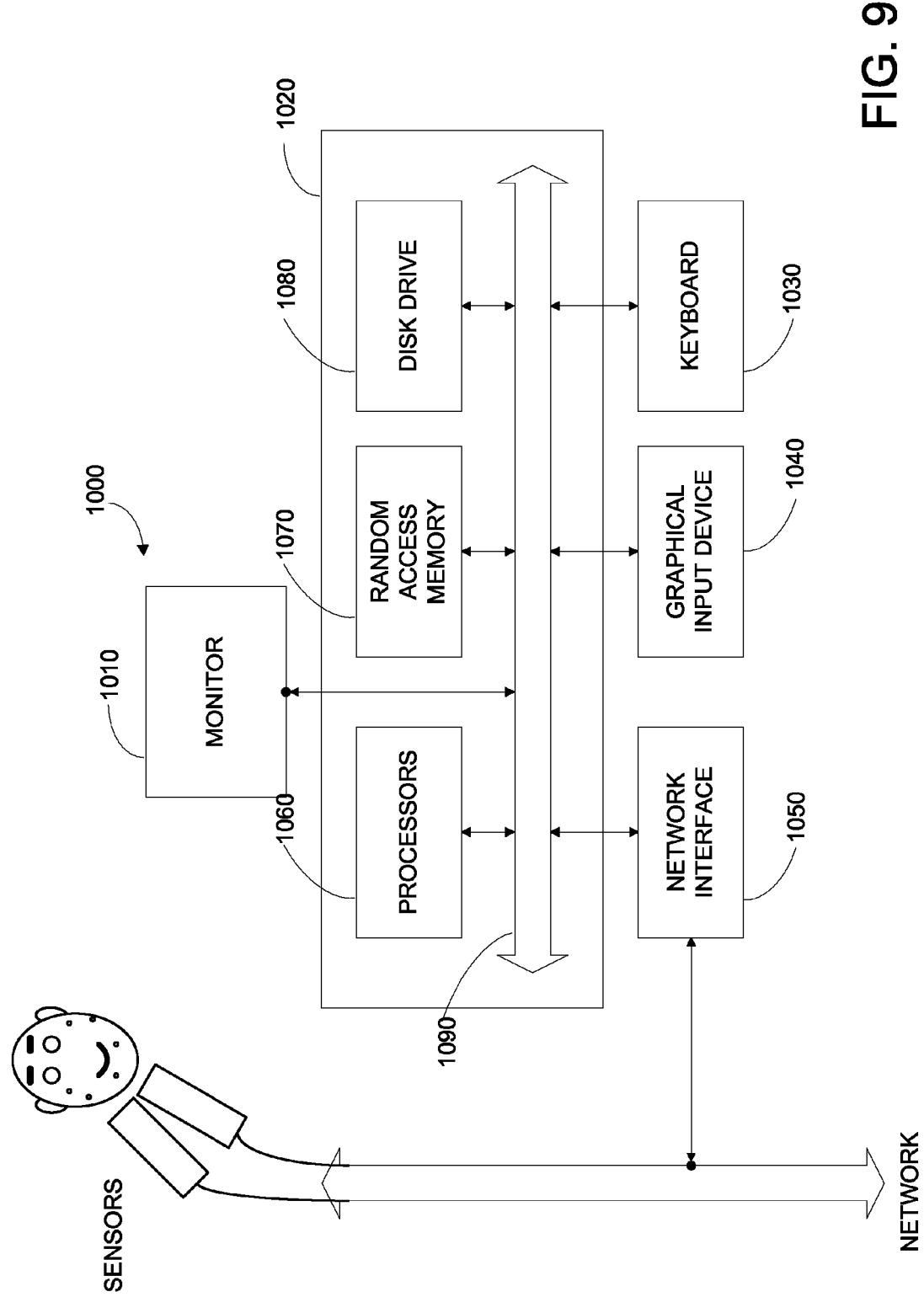
FIG. 9 is a block diagram of typical computer system according to an embodiment of the present invention.

FIG. 9 is a block diagram of typical computer system 1000 according to an embodiment of the present invention. In the present embodiment, computer system 1000 typically includes a display 1010, computer 1020, a keyboard 1030, a user input device 1040, computer interfaces 10100, and the like.

In various embodiments, display (monitor) 1010 may be embodied as a CRT display, an LCD display, a plasma display, a direct-projection or rear-projection DlP, a micro display, or the like. In various embodiments, display 1010 may be used to visually display user interfaces, images, or the like.

In various embodiments, user input device 1040 is typically embodied as a computer mouse, a trackball, a track pad, a joystick, wireless remote, drawing tablet, voice command system, eye tracking system, and the like. User input device 1040 typically allows a user to select objects, icons, text and the like that appear on the display 1010 via a command such as a click of a button or the like. Embodiments of computer interfaces 10100 typically include an Ethernet card, a modem (telephone, satellite, cable, ISDN), (asynchronous) digital subscriber line (DSL) unit, FireWire interface, USB interface, and the like. For example, computer interfaces 10100 may be coupled to a computer network, to a FireWire bus, or the like. In other embodiments, computer interfaces 10100 may be physically integrated on the motherboard of computer 1020, may be a software program, such as soft DSL, or the like.

In various embodiments, computer 1020 typically includes familiar computer components such as a processor 1060, and memory storage devices, such as a random access memory (RAM) 1070, disk drives 1080, and system bus 1090 interconnecting the above components.

In some embodiments, computer 1020 includes one or more Xeon microprocessors from Intel. Further, in the present embodiment, computer 1020 typically includes a UNIX-based operating system. RAM 1070 and disk drive 1080 are examples of computer-readable tangible media configured to store embodiments of the present invention, such as computer-executable computer code, source images, destination images, rendering engines, rendered images, or the like. Types of tangible media include magnetic storage media such as floppy disks, networked hard disks, or removable hard disks; optical storage media such as CD-ROMS, DVDs, holographic memories; semiconductor media such as flash memories, read-only-memories (ROMS); battery-backed volatile memories; networked storage devices, and the like.

In the present embodiment, computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 9 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Core™ microprocessors from Intel; Phnom™, Turion™ 64, Opteron™ microprocessors from Advanced Micro Devices, Inc; and the like. Further, other types of operating systems are contemplated, such as Windows Vista®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In other embodiments of the present invention, other implementations of the A* matching algorithm may be used. Further, other types of path matching algorithms may also be used by one of ordinary skill in the art. The above embodiments should therefore be considered merely illustrative of some implementations. Embodiments may be applied to a number of applications such as feature-length animated features, computer generated imagery to be combined with live-action footage, computer games, interactive computer applications, educational programs, and the like.

In other embodiments of the present invention, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprising:
    receiving a first view of a three-dimensional object from a first sensor from a first location with respect to the three-dimensional object, at a first instance in time, wherein the object includes a plurality of sensor markers;
    receiving a second view of the three-dimensional object from a second sensor from a second location with respect to the three-dimensional object, at substantially the first instance of time;
    determining a first plurality of points from the first view of the three-dimensional object in response to a first plurality of sensor markers from the plurality of sensor markers;
    determining a second plurality of points from the second view of the three-dimensional object in response to a second plurality of sensor markers from the plurality of sensor markers;
    determining at least an approximate correspondence between points in a subset of points from the first plurality of points and points in a subset of points from the second plurality of points, wherein determining the approximate correspondence comprises applying an A* algorithm to the points in the subset of points from the first plurality of points and the points in the subset of points from the second plurality of points, wherein a cost function computed under the A* algorithm includes at least one of:
        a first cost function computed depending on differences in angles between the first plurality of points and the second plurality of points, and
        a second cost function computed depending on differences in distances between the first plurality of points and the second plurality of points;
    determining approximate three-dimensional locations of a third plurality of sensor markers from the plurality of sensor markers in response to the approximate correspondence; and
    rendering an image of the three-dimensional object in response to the approximate three-dimensional locations of the third plurality of sensor markers.

2. The method of claim 1 wherein determining the approximate correspondence comprises performing a graph matching algorithm in response to the points in the subset of points from the first plurality of points and in response to the points in the subset of points from the second plurality of points.

3. The method of claim 1 wherein the determining the approximate correspondence comprises:
    determining a plurality of matches between the points in the subset of points from the first plurality of points and the points in the subset of points from the second plurality of points;
    computing a cost function associated with each match from the plurality of matches; and
    removing a first plurality of matches from the plurality of matches in response to the associated cost function, wherein the associated cost function with matches from the first plurality of matches is higher than an associated cost function of matches from a second plurality of matches from the plurality of matches.

4. The method of claim 3 wherein the subset of points from the second plurality of points is determined in response to an epipolar computation.

5. The method of claim 1 further comprising:
    storing a representation of the image on a tangible media;
    retrieving the representation of the image; and
    displaying the image to a user.

6. The method of claim 1 wherein a majority of sensor markers of the first plurality of sensor markers are also sensor markers in the second plurality of sensor markers.

7. A computer system comprising:
    a memory configured to store a first view of a three-dimensional object from a first sensor from a first location with respect to the three-dimensional object, at a first instance in time, wherein the object includes a plurality of sensor markers, and configured to store a second view of the three-dimensional object from a second sensor from a second location with respect to the three-dimensional object, at substantially the first instance of time;
    a processor coupled to the memory, wherein the processor is configured to:
        determine a first plurality of points from the first view of the three-dimensional object in response to a first plurality of sensor markers from the plurality of sensor markers,
        determine a second plurality of points from the first view of the three-dimensional object in response to a second plurality of sensor markers from the plurality of sensor markers,
        determine at least an approximate correspondence between points in a subset of points from the first plurality of points and points in a subset of points from the second plurality of points, wherein determining the approximate correspondence comprises applying an A* algorithm to the points in the subset of points from the first plurality of points and the points in the subset of points from the second plurality of points wherein a cost function computed under the A* algorithm includes at least one of:
            a first cost function computed depending on differences in angles between the first plurality of points and the second plurality of points, and
            a second cost function computed depending on differences in distances between the first plurality of points and the second plurality of points; and determine approximate three-dimensional locations of a third plurality of sensor markers from the plurality of sensor markers in response to the approximate correspondence; and a display coupled to the memory and to the processor, wherein the display is configured to display a representation of the approximate three-dimensional locations of the third plurality of sensor markers.

8. The computer system of claim 7 wherein the processor is configured to implement a graph matching algorithm in response to the points in the subset of points from the first plurality of points and in response to the points in the subset of points from the second plurality of points, to determine the approximate correspondence between points in the subset of points from the first plurality of points and points in the subset of points from the second plurality of points.

9. The computer system of claim 7:
wherein the processor is configured to determine a plurality of matches between the points in the subset of points from the first plurality of points and the points in the subset of points from the second plurality of points;
wherein the processor is configured to computing a cost function associated with each match from the plurality of matches; and
wherein the processor is configured to remove a first plurality of matches from the plurality of matches in response to the associated cost function, wherein the associated cost function with matches from the first plurality of matches is higher than an associated cost function of matches from a second plurality of matches from the plurality of matches.

10. The computer system of claim 7:
wherein the processor is configured to determine an epipolar relationship; and
wherein the processor is configured to determine the subset of points from the second plurality of points in response to an epipolar computation.

11. The computer system of claim 7:
wherein the processor is configured to render an image of the three-dimensional object; and
wherein the display is configured to display the image to a user.

12. A computer program product comprising a computer-readable tangible media including computer-executable code for a computer system including a processor and a memory, wherein computer-readable tangible media comprises:
code configured to direct the processor to receive a first image of a three-dimensional object from a camera from a first location with respect to the three-dimensional object, at a first instance in time, wherein the object includes a plurality of sensor markers;
code configured to direct the processor to receive a second image of the three-dimensional object from the camera from the first location with respect to the three-dimensional object, at a second instance of time;
code configured to direct the processor to determine a first plurality of points from the first image of the three-dimensional object in response to a first plurality of sensor markers from the plurality of sensor markers;
code configured to direct the processor to determine a second plurality of points from the second image of the three-dimensional object in response to a second plurality of sensor markers from the plurality of sensor markers;

code configured to direct the processor to determine at least an approximate correspondence between points in a subset of points from the first plurality of points and points in a subset of points from the second plurality of points, wherein determining the approximate correspondence comprises applying an A* algorithm to the points in the subset of points from the first plurality of points and the points in the subset of points from the second plurality of points, wherein a cost function computed under the A* algorithm includes at least one of:
a first cost function computed depending on differences in angles between the first plurality of points and the second plurality of points, and
a second cost function computed depending on differences in distances between the first plurality of points and the second plurality of points;
code configured to direct the processor to determine approximate three-dimensional displacements of a third plurality of sensor markers from the plurality of sensor markers in response to the approximate correspondence; and
code configured to direct the processor to display a representation of the approximate three-dimensional displacements of the third plurality of sensor markers on top of the first image.

13. The computer program product of claim 12 wherein code that determine the approximate correspondence comprises code configured to direct the processor to perform a graph matching algorithm in response to the points in the subset of points from the first plurality of points and in response to the points in the subset of points from the second plurality of points.

14. The computer program product of claim 12 wherein code that determine the approximate correspondence comprises:
code configured to direct the processor to determine a plurality of matches between the points in the subset of points from the first plurality of points and the points in the subset of points from the second plurality of points;
code configured to direct the processor to compute a cost function associated with each match from the plurality of matches; and
code configured to direct the processor to remove a first plurality of matches from the plurality of matches in response to the associated cost function, wherein the associated cost function with matches from the first plurality of matches is higher than an associated cost function of matches from a second plurality of matches from the plurality of matches.

15. The computer program product of claim 14 further comprising:
code configured to direct the processor to determine an epipolar relationship between the first image and the second image; and
code configured to direct the processor to determine the subset of points from the second plurality of points in response to the epipolar relationship.

16. The computer program product of claim 14 further comprising:
code configured to direct the processor to render an image of the three-dimensional object in response to the approximate three-dimensional displacements; and
code configured to direct the processor to display the image to a display.

* * * * *